INVENTOR
Raymond A. Bilancia
BY Merriam, Marshall, Shapiro & Klose
ATTORNEYS

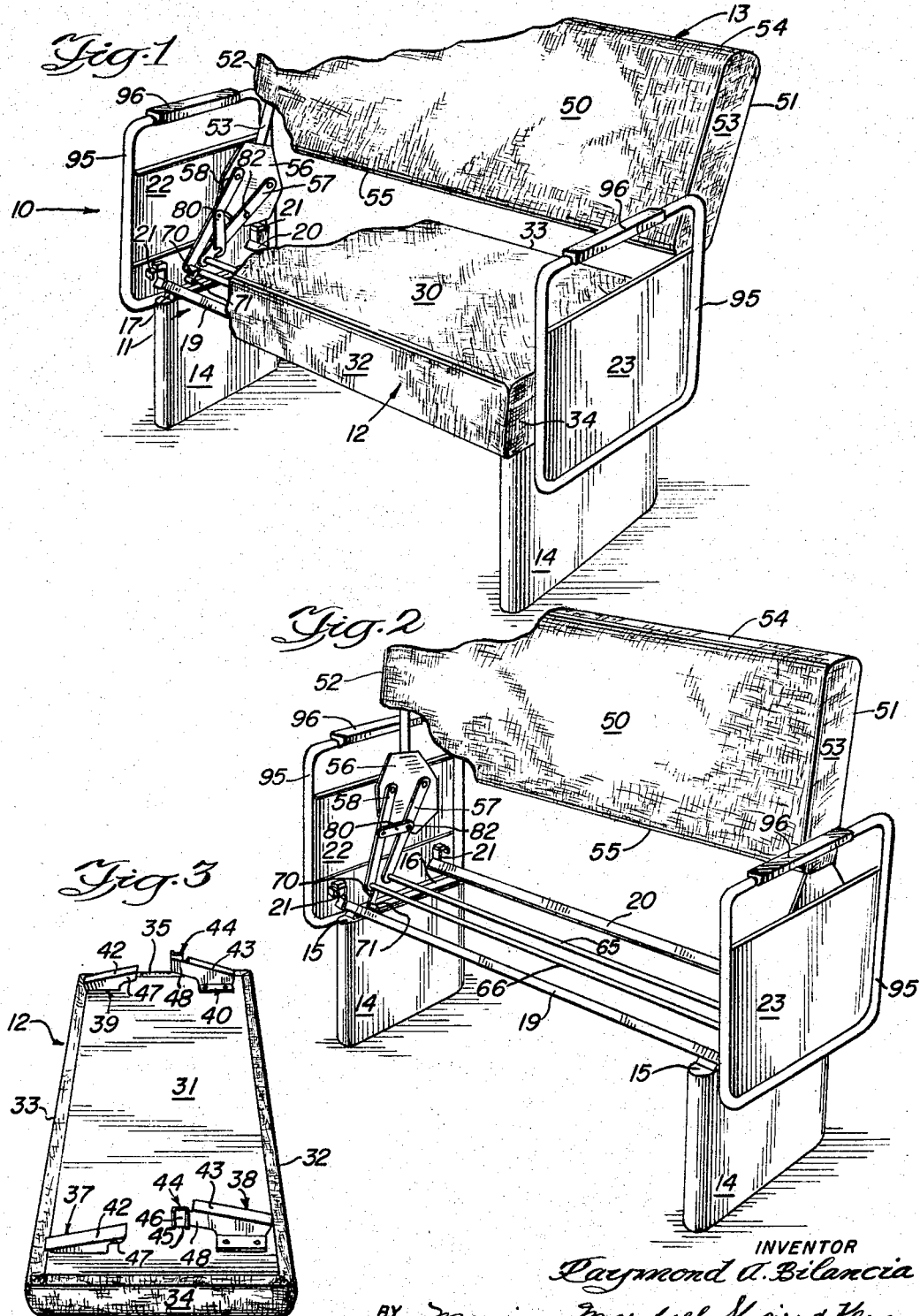

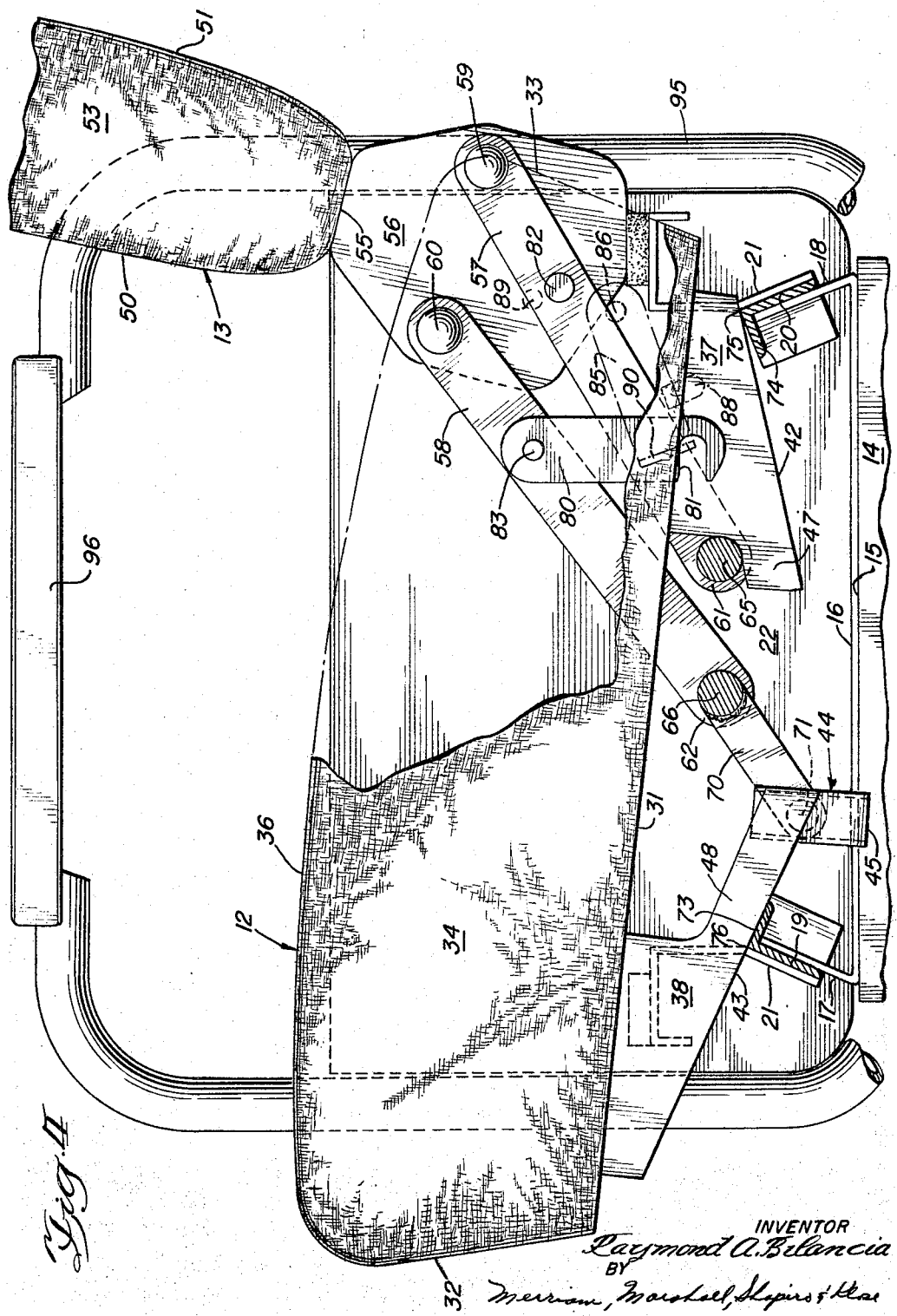

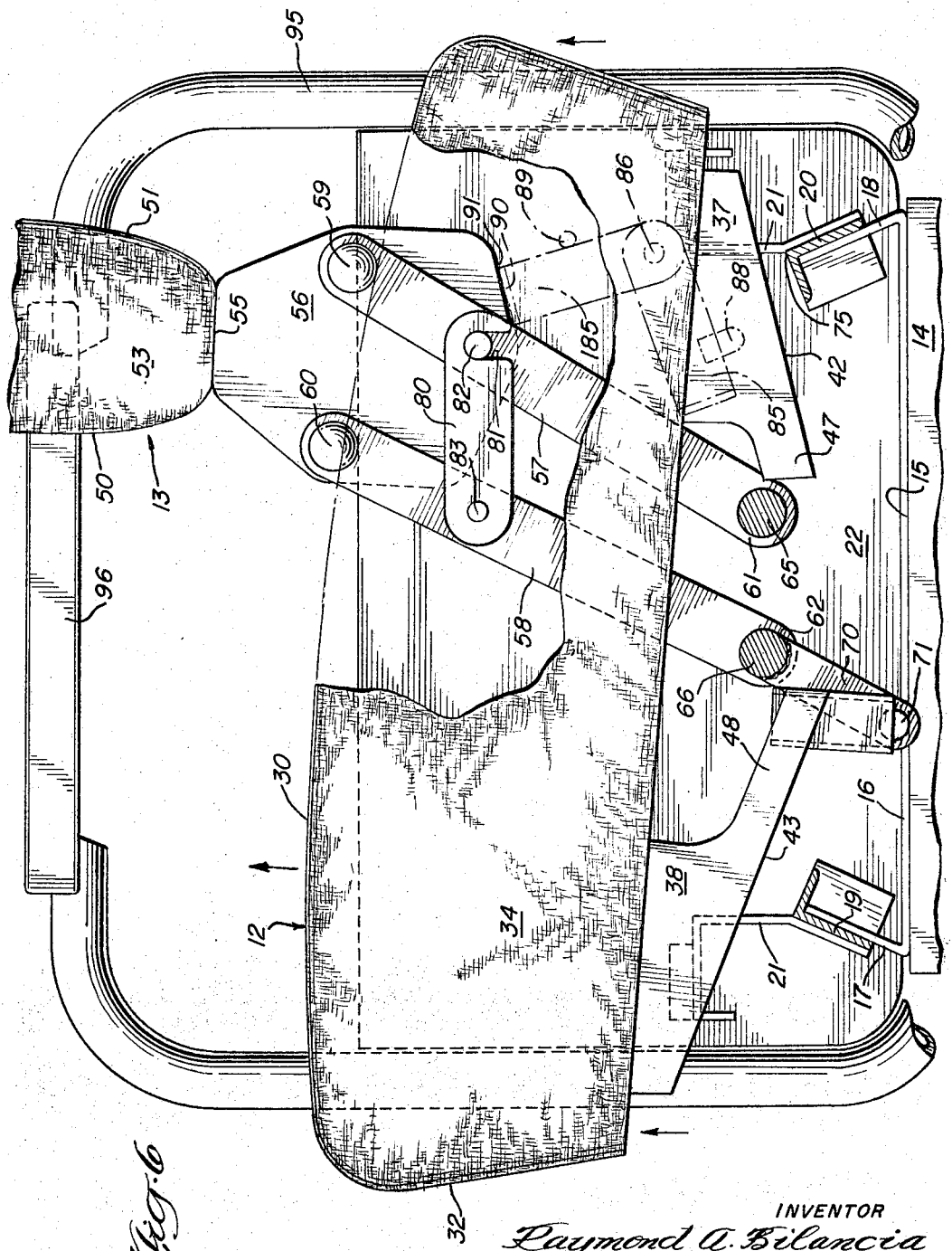

United States Patent Office 3,265,435
Patented August 9, 1966

3,265,435
ROCKERLESS WALK-OVER SEAT
Raymond A. Bilancia, Arlington Heights, Ill., assignor to Coach and Car Equipment Corporation, Chicago, Ill., a corporation of Illinois
Filed Jan. 3, 1966, Ser. No. 518,132
7 Claims. (Cl. 297—101)

The present invention relates generally to walk-over seats, and more particularly to a stable, rockerless walk-over seat having a minimum number of movable parts and provided with means for preventing removal of the seat cushion when the seat back is in a position for supporting the back of an occupant of the seat.

Walk-over seats, generally, are typically used on mass transit vehicles such as subway cars and commuter trains. A walk-over seat is a seat in which the seat back is movable, from a first supporting position, at one end of the seat cushion, across the top of the seat cushion to a second supporting position at the other end of the seat cushion, with the seat back remaining in a substantially vertical disposition throughout said movement. A walk-over seat is generally provided with a linkage, between the seat back and the seat cushion, which changes the inclination of the seat cushion, in response to movement of the seat back, so that the cushion is inclined slightly downwardly toward the seat back no matter which supporting position the seat back occupies. As a result, the direction in which the seat faces may be changed merely by moving the seat back between its first and second positions.

Conventionally, walk-over seats have utilized rockers, on the bottom of the seat cushion and supported by the seat frame, which rock to change the inclination of the seat cushion in response to movement of the seat back from one end of the cushion to the other. Drawbacks to rocker-type walk-over seats included noisiness during movement, rattles while at rest, relative complexity of structure, relative expense and substantial maintenance requirements.

In accordance with the present invention, seat cushion bottom rockers and their attendant draw-backs are eliminated, and the seat cushion is supported atop the seat frame by a pair of wedge-shaped members each fixed to the seat cushion, each located more closely adjacent a respective end of the seat cushion, each spaced from the other along the dimension between the opposite ends of the seat cushion and each having a lower surface inclined downwardly and inwardly toward the other support-engaging member.

A linkage connecting the seat cushion to the seat back moves the seat cushion, in response to movement of the seat back, in a direction having a horizontal component. This causes sliding movement of the lower inclined surface of at least one of the wedges on the portion of the seat frame supporting the wedge, and thus changes the inclination of the seat cushion.

The rockerless walk-over seat in accordance with the present invention also includes, together with the wedge-shaped members, a stabilizing member extending in a direction between opposite side ends of the seat back. This feature prevents distortion or twisting of the seat back during movement between its two supporting positions and permits easier movement of the seat back.

Another feature of the rockerless walk-over seat in accordance with the present invention prevents removal of the seat cushion from the seat frame when the seat back is in either of its two supporting positions, but permits removal with ease when the seat back is in a predetermined intermediate position located above the seat cushion. This feature minimizes theft and vandalism, problems not uncommon on mass transit facilities.

A further feature is the provision of means for maintaining the seat back in said predetermined intermediate position, to facilitate removal of the seat cushion for maintenance or other purposes.

Other features and advantages are inherent in the structure claimed and disclosed or will become apparent to those skilled in the art from the following diagrammatic drawings wherein:

FIGURE 1 is a perspective, partially cut away, of an embodiment of a rockerless walk-over seat constructed in accordance with the present invention;

FIGURE 2 is a perspective, partially cut away, of the seat of FIGURE 1, with the seat cushion removed and the seat back in its predetermined intermediate position for permitting removal of the seat cushion from the seat frame;

FIGURE 3 is a perspective of an embodiment of a seat cushion used with the seat of the present invention, with the bottom of the seat cushion facing upwardly;

FIGURE 4 is a fragmentary elevational view of the seat, partially cut away and partially in section, showing the seat back in one position for supporting the back of a seat occupant;

Figure 5:
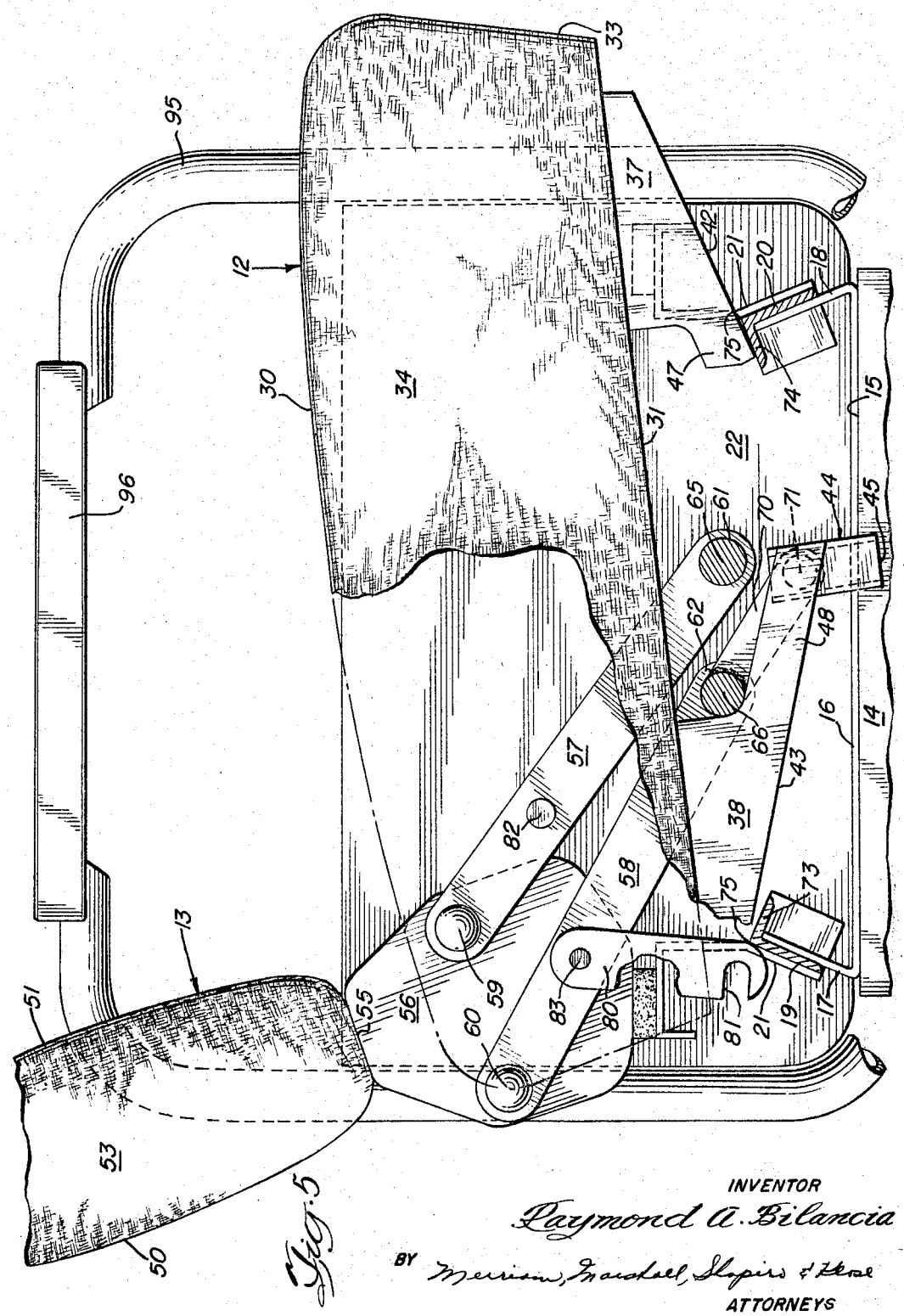

FIGURE 5 is a fragmentary elevational view, partially cut away and partially in section, showing the seat back in the other of its positions for supporting the back of the seat occupant; and FIGURE 6 is a fragmentary elevational view, partially cut away and partially in section, showing the seat back in its predetermined intermediate position for permitting removal of the seat cushion from the seat frame.

Referring initially to FIGURE 1, there is shown an embodiment of a rockerless, walk-over seat constructed in accordance with the present invention and indicated generally at 10. Seat 10 includes a frame, a seat cushion and a seat back indicated generally at 11, 12 and 13, respectively. In FIGURE 1, seat back 13 is disposed in a first position, at a first end 33 of seat cushion 12, for supporting the back of an occupant of seat 10.

Seat back 13 is connected to frame 11 and mounted for movement, along a path having a horizontal directional component, between the first supporting position, shown in FIGURES 1 and 4, and a second supporting position shown in FIGURE 5 wherein the seat back is at a second end 32 of seat cushion 12. When the seat back is in its first and second supporting positions of FIGURES 4 and 5, respectively, seat cushion 12 is in first and second inclined positions, respectively, illustrated in FIGURES 4 and 5.

FIGURES 2 and 6 illustrate seat back 13 in a predetermined intermediate position, between its first and second supporting positions. Seat cushion 12 cannot be readily removed from seat frame 11 unless seat back 13 is in said intermediate position.

The embodiment illustrated in the drawings will now be described with greater specificity.

Referring to FIGURES 1, 2 and 4, frame 11 includes a pair of legs 14, 14 each having a top 15 supporting a strip 16 having a pair of flanges 17, 18 inclined upwardly toward each other at opposite ends of strip 16. Each flange 17, 18 supports an L-shaped, longitudinally extending member 19, 20, said members 19, 20 constituting the cushion support means of frame 11.

Attached to each of the opposite ends of both frame members 19, 20 are brackets 21 in turn fixed to opposite sides 22, 23 of frame 11.

The periphery of each frame side 22, 23 is defined by a vertically disposed, rectangular member 95 having an arm rest 96 along the upper side thereof.

Referring to FIGURES 1, 3 and 4, seat cushion 12 includes a top 30, a bottom 31, opposite first and second ends 33, 32, respectively, and opposite sides 34, 35. The opposite ends 32, 33 of seat cushion 12 each extend between opposite sides 22, 23 of seat frame 11.

Referring to FIGURES 3 and 4, fixed to the bottom of seat cushion 12, are a first pair of separate, discrete, wedge-shaped, support-engaging members indicated generally at 37, 38 and a second pair of separate, discrete, wedge-shaped, support-engaging members indicated generally at 39, 40. The first pair of support-engaging members is located more closely adjacent cushion side 34, and the second pair of support-engaging members is located more closely adjacent cushion side 35. One support-engaging member (38, 40) of each pair is located more closely adjacent second end 32 of cushion 12; and another support-engaging member (37, 39) of each pair is located more closely adjacent cushion first end 33.

Support-engaging members 38 and 40 rest atop frame member 19 and support-engaging members 37, 39 rest atop the other frame member 20, when cushion 12 rests on frame 11 (FIG. 4).

Referring to FIGURES 3 and 4, each of support-engaging members 37, 39 has a lower surface 42, and each of support-engaging members 38, 40 has a lower surface 43. The lower surfaces 42, 43 of any pair of support-engaging members (e.g., 37 and 38) are inclined downwardly and inwardly toward the other support-engaging member and toward a respective opposite end 32, 33 of seat cushion 12. When seat cushion 12 is in its first inclined position shown in FIGURE 4, lower surface 43 on member 38 rests atop a flange 73 of frame member 19 and lower surface 42 on member 37 rests atop an edge 75 of L-shaped frame member 20. When seat cushion 12 is in its second inclined position shown in FIGURE 5, lower surface 42 on member 37 rests atop a flange 74 on frame member 20 and lower surface 43 on member 38 rests atop an edge 76 of L-shaped frame member 19.

Each of members 37, 39 is cut away at an inner-most part of the member to define a hook portion 47; and each of members 38, 40 is cut away at an innermost part of the member to define a hook portion 48.

Fixed to the remaining innermost part of each of members 38, 40 is a vertically disposed member 44 having a channel-shaped, horizontal cross section with an open bottom end 45 and an open side 46 (FIG. 3). Each of channel-shaped members 44 faces a respective frame side 22, 23 to which the member 44 is most closely adjacent.

Referring to FIGURES 1, 2 and 4, seat back 13 includes a pair of opposed surfaces 50, 51. When seat back 13 is in the position of FIGURE 4, surface 50 contacts the back of an occupant of seat 10; and when seat back 13 is in the position of FIGURE 5, surface 51 is the contacting surface. Back 13 also includes a pair of opposed side ends 52, 53, a top 54 and a bottom 55.

Each side end 52, 53 of seat back 13 is connected to a member 63 (FIG. 1) extending upwardly from a polygonal plate 56 constituting part of a linkage attaching seat back 13 to seat frame 11 and connecting the seat back to the seat cushion for movement of the latter in response to movement of the former.

The linkage is the same at each opposite side end 52, 53 of the seat back and attaches a respective side end 52, 53 to a corresponding side 22, 23 of seat frame 11.

As shown in FIGURES 4–6, in addition to plate 56, the linkage includes, at each side, a pair of levers 57, 58 each having a respective upper pivotal mounting 59, 60 on plate 56 and a respective lower end 61, 62 pivotally mounted on the most closely adjacent frame side, e.g. 22, in FIGURE 4.

Extending between frame sides 22, 23 are a pair of shafts 65, 66 (FIG. 2) each having opposite ends fixed between levers 57 or levers 58, respectively.

Each of shafts 65, 66 constitutes a horizontally disposed, elongated seat back stabilizing member extending in a direction transverse to the direction of horizontal movement of the seat back. Each of the stabilizing members 65, 66 is connected, through their corresponding levers, to both side ends 52, 53 of the seat back; and both stabilizing members are connected to opposite sides 22, 23 of the seat frame by virtue of the pivotal connections of the lower ends 61, 62 of the levers 57, 58 to the frame sides 22, 23. In this manner, shafts 65, 66 impart stability to seat back 13 during movement thereof. Accordingly, twisting and distortion of the seat back during its movement are minimized, and movement is thus facilitated.

During movement of the seat back, levers 57, 58 pivot about their mountings on the frame sides; and shafts 65, 66 rotate as levers 57, 58 pivot.

As the position of seat back 13 changes from that shown in FIGURE 4 to that shown in FIGURE 5, the inclination of seat cushion 12 changes from that shown in FIGURE 4 to that shown in FIGURE 5; and the movement of seat back 13 and seat cushion 12 are coordinated by linkage parts now to be described.

Referring to FIGURES 1, 2 and 4–6, fixed to shaft 66, and extending radially therefrom, is a link 70 terminating at a free end near which is fixed one end of a pin 71 extending horizontally from link 70 and terminating at a free end thereof. The free end of pin 71 slidably engages within vertically disposed, channel-shaped member 44 fixed on support-engaging members 38, 40 of cushion 12 when the seat back and the seat cushion are in the positions shown in FIGURES 4 and 5 and the intermediate positions therebetween.

The vertically disposed channel of member 44 accommodates vertical sliding movement of pin 71 during movement of seat back 13. This causes the seat cushion to move, in response to movement of the seat back, along a path having a horizontal directional component opposite to the horizontal direction in which the seat back moves. The engagement of pins 71 and channel-shaped members 44 not only changes the inclination of the seat cushion in response to movement of the seat back, but, also, restricts undesired sideward movement of the seat cushion between frame sides 22 and 23.

When seat back 13 and seat cushion 12 are in the position of FIGURE 4, hook portions 47 on support-engaging members 37, 39 engage beneath shaft 65, and prevent removal of seat cushion 12 from seat frame 11 and tipping of seat cushion 12 when a downward force is applied at end 32. When seat back 13 and seat cushion 12 are in the position illustrated in FIGURE 5, hook portions 48 on support-engaging members 38, 40 engage beneath shaft 66 to prevent removal of seat cushion 12 from seat frame 11 and tipping of seat cushion 12 when a downward force is applied at end 33.

During movement of seat back 13 and seat cushion 12 from the position of FIGURE 4 to the position of FIGURE 5, hook portions 47 become disengaged from beneath shaft 65 and hook portions 48 become engaged beneath shaft 66, and the opposite occurs during movement from the position of FIGURE 5 to the position of FIGURE 4.

In most of the intermediate positions between those of FIGURES 4 and 5, removal of seat cushion 12 from the seat frame is not readily done. However, there is an intermediate position between that of FIGURE 4 and that of FIGURE 5 in which neither hook portions 47 nor hook portions 48 are engaged beneath their respective shafts 65, 66; and in this predetermined intermediate position, illustrated in FIGURE 6, seat cushion 12 can be readily removed from seat frame 11. In the illustration of FIGURE 6 seat cushion 12 is shown lifted partially upwardly relative to seat frame 11.

In order to facilitate removal of seat cushion 12 from seat frame 11 (e.g., for purposes of seat maintenance and cleaning, or the like), means are provided, in accordance with the present invention, to maintain seat back 13 and seat cushion 12 in the predetermined intermediate position of FIGURE 6. One embodiment of such means is illustrated in solid lines in FIGURES 4–6. This embodiment includes a latch element 80 having one end pivotally mounted on lever 58 at 83. Latch element 80 includes a notch 81 for engaging element 80 with a pin 82 on lever 57 when seat back 13 and seat cushion 12 are in the predetermined intermediate position of FIGURE 6.

Latch element 80 may be manually manipulated from the disengaged, at rest positions of FIGURES 4 and 5 to the engaged position of FIGURE 6. As is apparent from FIGURE 6, when latch element 80 is manually disengaged from pin 82, seat back 13 and seat cushion 12 will return to the position of FIGURE 4 by the urging of gravity.

Other embodiments may be utilized for maintaining seat back 13 in its predetermined intermediate position; and another embodiment is illustrated in dash-dot lines in FIGURE 6.

This other embodiment includes an element normally located in the position indicated by 85 in FIGURE 6 and having a flange portion 90. The element at 85 is pivotally mounted to frame side 22 at 86 and is retained in a non-operative position by a spring clip 88 attached to frame side 22. When seat back 13 is in the predetermined intermediate position of FIGURE 6, the element at 85 is manually pivoted about the axis of 86 to the position indicated by 185 in FIGURE 6 wherein flange portion 90 engages a lower edge 91 of plate 56 to support plate 56 and retain seat back 13 and seat cushion 12 in the position of FIGURE 6. Movement of the element to the position indicated by 185 is determined by a stop 89 on frame side 22. Stop 89 lies in the pivotal path of the element and prevents movement of the element past the position indicated by 185.

After seat cushion 12 has been removed from frame 11, seat back 13 may be returned to either of the positions illustrated in FIGURES 4 and 5 merely by moving seat back 13 to the left, as viewed in FIGURE 6, and allowing the element illustrated in the dash-dot lines in FIGURE 6 to drop by gravity from the position illustrated by 185 to the position illustrated by 85.

The foregoing detailed description has been given for clearness of understanding only, and no unnecessary limitations should be understood therefrom, as modifications will be obvious to those skilled in the art.

What is claimed is:

1. In a walk-over seat:
   a frame;
   a seat cushion having a first end and a second end;
   a seat back;
   said frame including means for supporting said seat cushion in an occupant-accommodating position;
   means connecting said seat back to said frame and mounting the seat back for movement between a first position at said first end of the seat cushion and a second position at said second end of the seat cushion;
   and means for changing the inclination of said seat cushion in response to movement of the seat back between its first and second positions;
   said inclination-changing means consisting essentially of one means fixed to said seat cushion and another means fixed to said connecting means and cooperating with said one means;
   means for preventing removal of the seat cushion from its occupant-accommodating position when the seat back is in its first or second position and for permitting removal of the seat cushion when the seat back is in a predetermined intermediate position located between said first and second positions;
   and means operable to retain the seat back in said predetermined intermediate position.

2. In a walk-over seat as recited in claim 1 wherein said retaining means comprises manually operable means.

3. In a rockerless walk-over seat:
   a frame having a pair of opposite sides;
   a seat cushion having opposite first and second ends each extending between said opposite sides of the frame;
   said frame including a pair of spaced-apart cushion-support means;
   a seat back having a pair of opposite side ends;
   means connecting said seat back to said frame and mounting the seat back for movement, having a horizontal directional component, between a first position at said first end of the seat cushion and a second position at said second end of the seat cushion;
   means for changing the inclination of the seat cushion in response to movement of the seat back between its first and second positions;
   a pair of separate, discrete support-engaging members, each spaced from the other along the dimension between the first and second ends of the seat cushion, each fixed to and located below the seat cushion, and each located more closely adjacent a respective end of the seat cushion than the other of said support-engaging members;
   each of said spaced support-engaging members including lower surface means, inclined downwardly and inwardly toward the other support-engaging member and toward a respective opposite end of the cushion, for resting atop a respective one of said cushion-support means, whereby said seat cushion is supported in an occupant-accommodating position atop said cushion-support means;
   said inclination-changing means consisting essentially of one means fixed to a support-engaging member and another means fixed to said connecting means and cooperating with said one means;
   elongated means, having opposite ends connected to respective opposite side ends of said seat back, for stabilizing said seat back during movement thereof;
   means, including means on said support-engaging members, for preventing removal of the seat cushion from its occupant-accommodating position when the seat back is in its first or second positions and to permit removal of the seat cushion when the seat back is in a predetermined intermediate position located between said first and second positions;
   and means operable to retain the seat back in said predetermined intermediate position.

4. In a rockerless walk-over seat as recited in claim 3 wherein:
   said stabilizing means for the seat back includes horizontally disposed shaft means rotatably mounted on said frame, fixed to said connecting means and located below the seat cushion and between the two spaced-apart support-engaging members;
   and each of said support-engaging members includes an integral hook portion for respectively engaging beneath said shaft means when the seat back is in a respective one of its first and second positions, whereby removal of the seat cushion from the seat frame is prevented when the seat back is in said two positions.

5. In a rockerless walk-over seat as recited in claim 3 wherein said retaining means comprises manually operable means.

6. In a rockerless walk-over seat as recited in claim 4 wherein said inclination-changing means comprises:
   link means having one end fixed to said shaft means and extending radially therefrom;
   a pin having one end fixed to said link means;
   said pin extending horizontally from said link means and terminating at a free end;
   a member fixed to said seat cushion;
   said fixed member including vertically disposed means for engaging said pin and for accommodating vertical sliding movement of said pin within said vertically disposed means to urge said seat cushion in a horizontal direction in response to movement of the seat back in a horizontal direction, whereby the inclination of said seat cushion is changed in response to movement of said seat back between its first and second positions;

said fixed member including means for disengaging said pin when the seat back is in a predetermined intermediate position between its first and second positions.

7. In a seat cushion having opposite sides and opposite first and second ends:

a pair of separate, discrete, wedge-shaped members, each spaced from the other along the dimension between the first and second ends of the seat cushion, each fixed to said seat cushion, and each located more closely adjacent a respective end of the seat cushion than the other of said support-engaging members;

each of said spaced support-engaging members including lower surface means, inclined downwardly and inwardly toward the other support-engaging member and toward a respective opposite end of the cushion;

each of said wedge-shaped members having an innermost part cut away to define an integral hook portion at the inner end of the member;

and vertically disposed means fixed to said seat cushion, said vertically disposed means having an open channel along one vertical side and an open bottom.

References Cited by the Examiner
UNITED STATES PATENTS

| Number | Date | Name | Class |
|---|---|---|---|
| 658,864 | 10/1900 | Pickels | 297—103 X |
| 658,949 | 10/1900 | Kling | 297—103 X |
| 675,367 | 5/1901 | Gilfillan | 297—101 |
| 1,196,908 | 9/1916 | Walker | 297—103 X |
| 1,298,823 | 4/1919 | Taylor | 297—103 X |
| 1,968,434 | 7/1934 | Bell | 297—103 X |
| 2,082,297 | 6/1937 | Miller | 297—103 X |
| 2,726,708 | 12/1955 | Eickhorn et al. | 297—103 X |
| 3,150,897 | 9/1964 | Higley | 297—103 |
| 3,171,685 | 3/1965 | Hershberger et al. | 297—92 |

FRANK B. SHERRY, *Primary Examiner.*

J. T. McCALL, *Assistant Examiner.*